Figure 1:
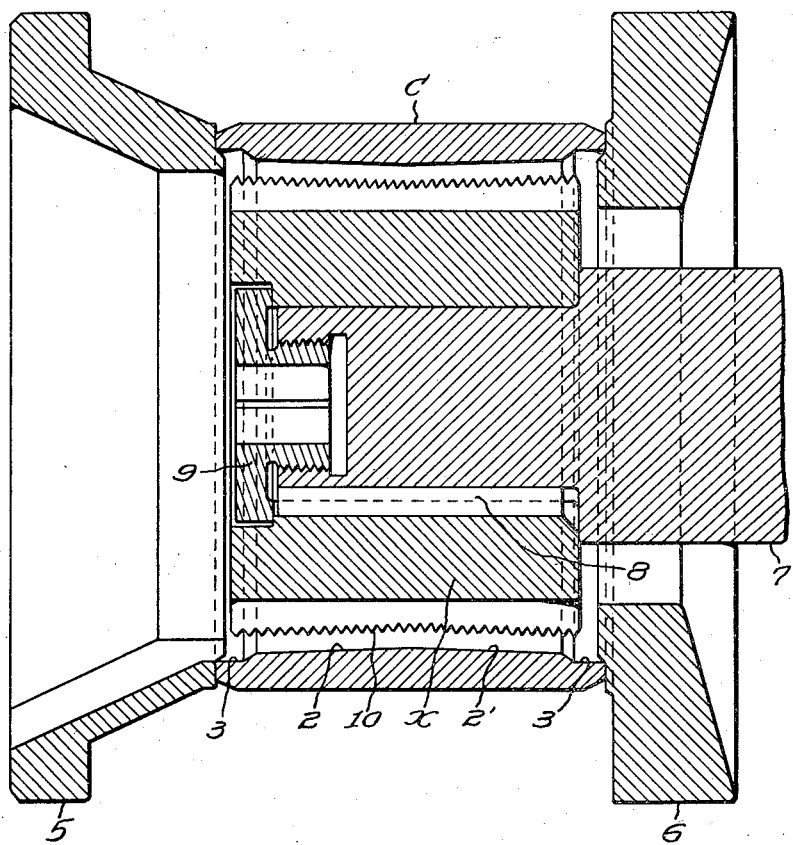

Dec. 24, 1935.  T. C. THOMAS ET AL  2,025,558
METHOD OF THREADING PIPE COUPLINGS
Filed Aug. 4, 1933   2 Sheets-Sheet 1

INVENTORS
Thomas C. Thomas,
Stephen J. Sferra.
BY
ATTORNEY

WITNESS

Dec. 24, 1935.  T. C. THOMAS ET AL  2,025,558
METHOD OF THREADING PIPE COUPLINGS
Filed Aug. 4, 1933  2 Sheets-Sheet 2
Fig. 3.
Fig. 2.
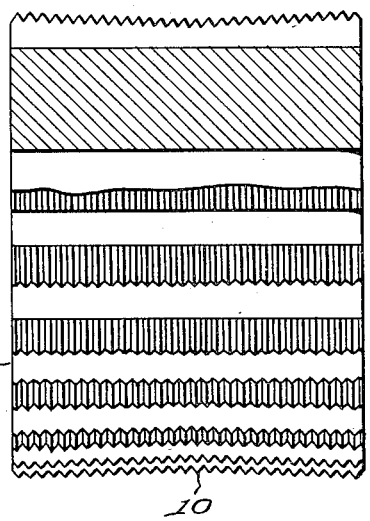
Fig. 6.
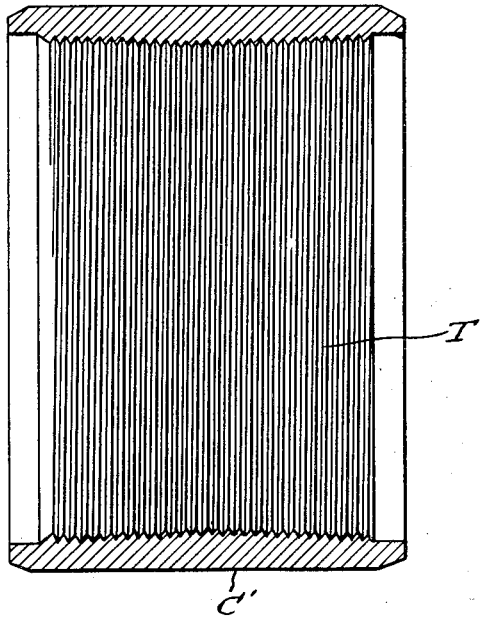
Fig. 4.
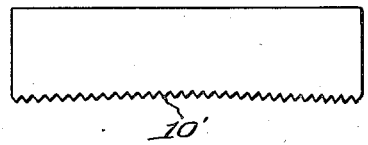
Fig. 5.
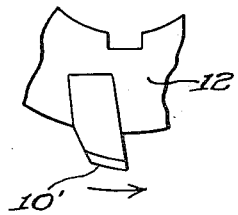
WITNESS
F. J. Hartman.
INVENTORS
Thomas C. Thomas,
Stephen J. Sferra.
BY George K. Hilbert
ATTORNEY Patented Dec. 24, 1935

2,025,558

UNITED STATES PATENT OFFICE 2,025,558

METHOD OF THREADING PIPE COUPLINGS

Thomas C. Thomas and Stephen J. Sferra, Youngstown, Ohio

Application August 4, 1933, Serial No. 683,588

10 Claims. (Cl. 10—154)

Ordinary pipe couplings embody threads of constant pitch, taper and direction which extend inwardly from each end and two methods have heretofore been generally used to form them by a milling or analogous operation. In accordance with the first of these a single head machine operating a single cutter is employed; the coupling blank is chucked in a suitable fixture or the like and the thread cut in one end thereof, after which the coupling is unchucked, turned end for end, rechucked and the thread cut in the other end. This method is open to certain disadvantages among which may be mentioned the necessity for chucking each coupling twice, the fact that the chucking operation must be very carefully performed to insure proper alignment of the threads in the coupling as a whole, and finally the difficulty, if not substantial impossibility, of avoiding overlapping of the threads at the center of the coupling where it is desired to thread the latter from end to end instead of leaving an unthreaded portion or land at its center. The second of these methods requires the use of two oppositely disposed single head milling machines or a machine provided with two oppositely disposed heads each actuating a similar cutter so that the coupling can be chucked between the cutters and the threads cut simultaneously in its opposite ends. Obviously this method avoids chucking the coupling twice and is thus reasonably satisfactory from an operating standpoint when it is permissible to leave an unthreaded zone or land at the center of the coupling but is unsatisfactory where a continuous thread from one end to the other of the coupling is required so that the adjacent ends of the pipe sections which it is designed to unite can be brought into abutting relation when fully screwed home. Moreover, the initial cost and upkeep expense of the machines requisite for its performance is substantially double that involved for the practice of the first method.

It is therefore an object of the present invention to provide a method of forming a continuous internal thread, oppositely inwardly tapered from its extremities, in a pipe coupling or other generally similar hollow article by a single milling operation and with but a single chucking of the coupling blank whereby, among other things, perfect concentricity of the thread with its axis throughout its length is insured, the necessity of using two single head milling machines in opposed relation or a machine provided with two heads is avoided and the time required for chucking and threading the coupling reduced to approximately one-half of that hitherto required when using a single head milling machine.

Other objects, advantages, improvements, novel steps and operations comprehended by our invention are hereinafter more particularly mentioned or will be apparent to those skilled in the art from the following description thereof during which reference will be had to the accompanying drawings.

In the practice of the method of our invention, the cutter is rotated on its own axis and then relative movement effected between the cutter and the coupling blank or other work such that the rotating cutter is brought from a position in which it is out of engagement with the blank to one in which it is cutting into it to a predetermined depth; the cutter is then caused to follow an orbital path about the surface of the blank for at least a complete revolution while, simultaneously therewith, a relative longitudinal or axial movement is effected between the blank and the cutter at a predetermined rate of progression in accordance with the pitch of the particular thread which is to be cut therein. These several operations may be brought about in various ways by suitable relative movements of the blank and/or the cutter, but as it is frequently preferred to hold the blank in a fixed position and move the cutter relatively to it, we shall more particularly refer herein by way of example to that method of procedure, it being understood, however, that any other manner of effecting the requisite relative movements between the cutter and the blank may be employed if desired. Moreover, as machines adapted to impart to the cutter the requisite movements with respect to the blank when the latter is maintained in fixed position are well known and in general use, and as the particular machine or apparatus employed for moving the cutter and/or the blank forms no part of the present invention, we have shown in the drawings only so much of a typical cutter actuating machine as is requisite for a proper understanding of the invention and have also merely shown one type of conventional chucking mechanism adapted for holding the coupling blanks in a stationary position during the threading operation but any other form of chucking means, such as one adapted to grip the coupling blanks from the outside instead of from the inside may be utilized while, of course, where the blank is to be rotated or otherwise moved instead of held stationary while it is being threaded, some form of apparatus adapted for imparting the required movements to the blank as well as for centering and chucking it will be employed in lieu of means for merely holding it in fixed position.

In the drawings, Fig. 1 shows in central longitudinal section a coupling blank chucked in an operatively fixed position for threading as well as one type of threading cutter adapted for the performance of the method of our invention, and a portion of the spindle of the cutter actuating machine preparatory to the commencement of the threading operation; Fig. 2 is a fragmentary end view of the cutter shown in Fig. 1 removed from the spindle; Fig. 3 is a side view thereof partially in elevation and partially in longitudinal section; Fig. 4 is an elevation of a cutter blade constructed in accordance with the invention adapted for use in an inserted blade cutter; Fig. 5 is a fragmentary end view showing such blade in place in the cutter body, and Fig. 6 is a central longitudinal section of the coupling after threading. Throughout the drawings like characters of reference are used to designate the same parts.

It will be understood that the coupling blanks are suitably machined preparatory to threading so as to present an interior surface of reasonable accuracy and free from scale for the action of the threading cutter, this surface being preferably inwardly tapered from the opposite ends of the blank to thereby relieve the cutter of the duty of removing substantially more metal from one part of the blank than from another. More particularly, the coupling blank C, which is of generally hollow cylindrical form, is preferably initially machined so as to present oppositely inwardly tapered internal surfaces 2, 2'; adjacent the ends of these surfaces the blank may be chamfered out slightly as at 3 while its end faces are desirably machined off exactly normal to its axis. A blank of this character may be conveniently chucked between two annular face plates 5, 6, embodied in a suitable fixture or the like and capable of being moved relatively toward and away from each other so that they may be separated to permit the blank to be placed between them and then moved against its ends so as to hold it firmly in position, the opposite inner faces of the plates being formed to enter the chamfers at the ends of the blank and thus properly center it with relation to the axis of the cutter. It will be appreciated, of course, that face plates of the character illustrated while eminently suitable for holding and centering the coupling are to be considered as merely typical of any suitable chucking and centering means and consequently that any other such means may be utilized.

The cutter, generally designated as X, is secured in operatively fixed relation with the end of the spindle 7 of the milling or other machine by which it is actuated and may be either of the solid or inserted blade type, that shown in Fig. 1 being of the former. In such case, the body of the cutter is provided with an axial bore to receive the reduced end of the machine spindle which forms a snug fit therein, a spline 8 preventing relative revolution between the parts while a flanged plug 9 threaded into the end of the spindle with its flange seating in a counterbore in the adjacent end of the cutter holds the latter in place against the shoulder formed at the junction of the reduced end and body of the spindle so that the cutter is firmly operatively yet removably positioned on the latter, but any other means for suitably holding the cutter in place may be employed if preferred.

Since during the threading operation a relative longitudinal or axial movement of progression is effected between the cutter and the work, the cutting teeth 10 with which the cutter is provided consist of a series of alternate grooves and ridges having the profile of the thread to be formed but arranged in parallel planes normal to the axis of the cutter instead of forming a helix thereabout, the cutter being provided with generally longitudinally or spirally extending circumferentially spaced grooves 11 in the ordinary way so as to afford suitable relief to the teeth. Therefore, insofar as their shape and individual arrangement is concerned, the teeth do not differ from those customarily found in "no pitch" cutters or hobs designed for milling threads but such cutters, so far as we are aware, have always been made of constant diameter throughout their length or else tapered with a constant taper from one end to the other. In accordance with the present invention, however, the cutter is oppositely tapered from its ends so it is of minimum or maximum diameter at some point therebetween, the inclination of each of the tapered zones of course conforming to the taper desired in the corresponding zone of the thread to be formed in the coupling. Such cutter may be readily constructed by utilizing a hob or milling cutter having opposite but corresponding tapers, for example, a hob of least diameter at its ends and of greatest diameter at a point therebetween, when the cutter is to be inwardly oppositely tapered from its ends and thus adapted to form an oppositely inwardly tapered thread in the coupling.

We have heretofore referred more particularly to a solid cutter, such as is shown in Figs. 1–3, inclusive, but if preferred the principles of the invention may be employed with equal facility with the aid of an inserted blade type cutter having blades of the general character of those shown in Figs. 5 and 6, each such blade comprising teeth 10' "without pitch" and therefore similar to the teeth 10 and being oppositely tapered from its ends to its center similarly to each row of teeth in the solid type cutter. These blades are adapted for disposition in circumferentially spaced relation in a cutter body 12 in which they are secured in any of the customary ways and so arranged that the teeth in each blade "track" with the teeth in all the others whereby the apex of each tooth in each blade lies in the same plane normal to the axis of the cutter as the apices of the corresponding teeth in all the other blades, any number of which may be associated with the body although preferably as many as is conveniently possible. It will further be apparent the cutter instead of being formed from a solid body of metal or by means of separate blades inserted in a suitable body, may be built up in sections suitably secured together, and this type will often be preferred.

In the practice of the method when the coupling blank is to be held stationary while being threaded, a suitable cutter of any of the types to which we have referred is first operatively disposed on the spindle of the cutter actuating machine so as to extend beyond the face of the plate 6 which, it will be assumed for convenience, is relatively fixed with respect thereto while the plate 5 is capable of retraction to the left for a sufficient distance to permit the coupling blank C to be slipped over the cutter when the plate is so retracted. After the blank is thus placed about the cutter, the plate 5 is moved to the right by suitable mechanism (not shown) so as to force the blank against the plate 6 and properly center and clamp it for the threading operation, as shown in Fig. 1. From an inspection of this figure it will be noted that the cutter is made a little longer than the combined length of the surfaces 2, 2' which are to be threaded so that at the initiation of the cutting operation it overhangs the latter a little at each end while its diameter is preferably only a little less than the minimum internal diameter of the blank. When thus chucked as a preliminary to the actual threading operation, the blank clears the cutter at all points and the latter can therefore be rotated on its own axis by the machine of which it now forms a component element without engaging the surface of the blank and, after it has been thus set in rotation, the machine is so operated as to move the cutter in a generally radial direction with respect to the blank until the cutter teeth are brought to a sufficient depth in the blank to properly form the desired threads. Thereupon through the action of the machine, the cutter is given an orbital movement about the blank and at the same time a movement of longitudinal progression in either direction at a rate determined by the pitch desired in the thread with the result that the teeth of the cutter form a continuous helical thread in the blank which is theoretically completed after the cutter has moved entirely around the interior thereof, although in order to insure proper meeting of the threads at the beginning and termination of the cut, it is preferable to move the cutter through a little more than 360°. Upon the completion of the orbital movement of the cutter the machine operates to retract it from the blank in a generally radial direction so as to fully clear it therefrom, after which the plate 5 may be moved out to permit the threaded coupling C' to be removed from the chucking fixture preparatory to inserting another blank therein.

Thus, a full and continuous thread T oppositely tapering from each end toward the center of the coupling has been formed on the combined length of the surfaces 2, 2' in the coupling blank, as shown in Fig. 6, the production of this thread requiring but a single chucking of the blank and but a single relative orbital movement of one threading cutter thereabout. Moreover, since the thread is continuous, the ends of the pipes when assembled with the coupling can be screwed fully home therein so that their ends will meet at the center of the coupling instead of being necessarily spaced as is the case where the threads are non-continuous and an unthreaded zone or land is present between them. It will further be apparent that in the practice of our method the time required for forming a continuous but oppositely tapered thread extending from one end of the coupling to the other is minimized since but one chucking and one milling operation is required therefor, while the threads in each end of the coupling are always in proper axial alignment with those in the opposite end. Consequently, approximately but one-half the time and labor is expended for threading the coupling in accordance with our method than that heretofore required for threading a coupling by the use of a single cutter operated by a single head machine so that substantially double the number of couplings can be turned out in the same length of time with the same initial expenditure for machines, while, on the other hand, although no great saving of time is effected in the chucking and threading operations over that required for chucking and threading a coupling in a double head or like machine using two cutters operating on opposite ends of the blank simultaneously, the practice of such method entails substantially double the initial expense for machines and double the upkeep expense thereof, while, as heretofore pointed out, it is substantially impossible to thereby form a continuous thread from one end of the coupling to the other.

Although we have referred herein more particularly to the use of our invention for threading couplings, it will be understood that it may be employed with equal facility for threading other hollow cylindrical objects in the interiors of which it is desired to form oppositely tapered threads, while, equally so, the principles of the invention can be used for forming external oppositely tapered threads on such articles as radiator nipples and the like, since under such conditions after the cutter has been brought to depth in the exterior instead of the interior surface of the work, a relative orbital and progressive longitudinal movement is effected between the cutter and the work with resultant formation of a continuous oppositely tapered thread thereon.

It is furthermore a matter of choice whether the cutter employed is of the solid, built-up or inserted blade type as all will operate satisfactorily in the performance of our method which in itself is susceptible of modifications in various particulars, if desired, without departing from the spirit and scope of the invention as defined in the appended claims.

Having thus described our invention, we claim and desire to protect by Letters Patent of the United States:

1. A method of forming in a tubular blank a continuous uninterrupted thread having adjacent zones oppositely tapering with respect to its axis which comprises the steps of disposing the blank about a threading cutter having teeth without pitch arranged in circumferentially spaced rows respectively inwardly inclined from the ends of the cutter toward its center, holding the blank in a fixed position, rotating the cutter, and imparting to the rotating cutter a generally radial movement with respect to the blank to bring it to predetermined cutting depth therein, and thereafter a combined orbital movement about the blank and a progressive axial movement.

2. A method of forming in a tubular blank a continuous uninterrupted thread having adjacent zones oppositely tapering with respect to its axis which comprises the steps of disposing the blank about a threading cutter having teeth without pitch arranged in circumferentially spaced rows respectively inwardly inclined from the ends of the cutter toward its center, holding the blank in a fixed position, rotating the cutter, and imparting to the rotating cutter a generally radial movement with respect to the blank to bring it to predetermined cutting depth therein and, thereafter, a combined orbital movement about the blank and, simultaneously therewith for each complete orbital movement, a progressive longitudinal movement substantially equal to the distance between the points of adjacent cutter teeth.

3. The method of forming in a hollow coupling blank a continuous internal thread tapering inwardly from its opposite ends to a point substantially midway between them, which comprises the steps of holding the blank in fixed position and then imparting to a rotating cutter disposed within the blank having threads without pitch arranged in circumferentially spaced rows respectively inwardly inclined from the ends of the cutter toward its center a generally radial movement with respect to the blank to bring said teeth to predetermined cutting depth in its surface and finally a full orbital movement about the blank and during such movement a progressive axial movement substantially equal to the distance between the points of adjacent teeth.

4. The method of forming in a hollow coupling blank during a single cyclic movement of a threading cutter a continuous thread extending substantially through the blank and tapering inwardly from its opposite ends, which comprises the steps of holding the blank in a fixed position about a cutter of greater length than the surface to be threaded and having circumferentially spaced rows of cutting teeth arranged in planes normal to its axis each tooth approximating the profile of the desired thread and being radially outwardly offset from other teeth in the row lying more nearly adjacent its longitudinal center, rotating the cutter on its own axis and, while so rotating, moving it in a generally radial direction to cause its teeth to enter the blank to a predetermined depth, then carrying the rotating cutter about the interior of the blank and simultaneously imparting to it a progressive longitudinal movement to thereby cause the cutter teeth to trace in the blank helical grooves whose pitch is determined by the rate of said progressive movement.

5. A method of forming in a tubular blank a continuous uninterrupted thread having adjacent zones oppositely tapering with respect to its axis which comprises the steps of simultaneously cutting in the blank a plurality of parallel thread grooves each radially offset from its next adjacent grooves, the grooves lying on either side of the groove midway between the ends of the thread being radially offset therefrom in the same direction and those lying on either side of any of the other grooves being respectively radially offset from such groove in opposite directions, and extending the grooves helically through an arc of 360° in the wall of the blank to thereby merge one end of each groove with the opposite end of an adjacent groove to complete the thread.

6. A method of forming in the surface of a blank a continuous uninterrupted thread having adjacent zones oppositely tapered with respect to its axis, which comprises the steps of disposing the blank adjacent and in axially parallel relation to a threading cutter having teeth without pitch arranged in circumferentially spaced rows respectively inclined in opposite directions from its ends, and while rotating the cutter, effecting relative movement between the blank and the cutter to bring the latter to predetermined cutting depth in said surface, then effecting relative movement between the blank and the cutter about the axis of the blank, and, simultaneously therewith, effecting a relative progressive longitudinal movement between the blank and the cutter parallel to said axis.

7. A method of forming in the surface of a blank a continuous uninterrupted thread having adjacent zones oppositely tapered with respect to its axis, which comprises the steps of disposing the blank adjacent and in axially parallel relation to a threading cutter having teeth without pitch arranged in circumferentially spaced rows respectively inclined in opposite directions from its ends, and while rotating the cutter about its axis, effecting relative movement between the cutter and the blank sufficient to bring the cutter to predetermined cutting depth in said surface, then rotating the blank about its own axis until the cutter has been caused to traverse said surface through an arc of at least 360°, and, simultaneously with said movement, progressively moving the rotating blank axially relative to the cutter for a predetermined distance.

8. A method of forming in the surface of a blank a continuous uninterrupted thread having adjacent zones oppositely tapered with respect to its axis, which comprises the steps of disposing the blank adjacent and in axially parallel relation to a threading cutter having teeth without pitch arranged in circumferentially spaced rows respectively inclined in opposite directions from its ends, and while rotating the cutter, moving the cutter toward said surface until it attains a predetermined depth of cut therein, then rotating the blank about its own axis until the cutter has been caused to traverse said surface through an arc of at least 360°, and, simultaneously with said traversing movement, progressively moving the rotating blank axially relative to the cutter for a predetermined distance.

9. A method of forming in the surface of a blank a continuous uninterrupted thread having adjacent zones oppositely tapered with respect to its axis, which comprises the steps of disposing the blank adjacent and in axially parallel relation to a threading cutter having teeth without pitch arranged in circumferentially spaced rows respectively inclined in opposite directions from its ends, and while rotating the cutter, moving the cutter toward said surface until it attains a predetermined depth of cut therein, then rotating the blank about its own axis until the cutter has been caused to traverse said surface through an arc of not less than 360°; and, simultaneously therewith, progressively moving the cutter axially relative to the blank for a predetermined distance.

10. A method of forming in the surface of a blank a thread having adjacent zones oppositely tapered with respect to its axis, which comprises the steps of disposing the blank adjacent and in axially parallel relation to a threading cutter having teeth without pitch arranged in circumferentially spaced rows respectively inclined in opposite directions from its ends, and while rotating the cutter, moving the cutter toward said surface until it attains a predetermined depth of cut therein, then rotating the blank about its own axis until the cutter has been caused to traverse said surface through an arc, and, simultaneously therewith, progressively moving the cutter axially relative to the blank for a predetermined distance.

THOMAS C. THOMAS.
STEPHEN J. SFERRA.